United States Patent
Iwamoto et al.

(10) Patent No.: US 12,517,512 B2
(45) Date of Patent: Jan. 6, 2026

(54) CONTROL METHOD FOR CONTROLLING DELIVERY SYSTEM

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 331 days.

(21) Appl. No.: 17/982,693

(22) Filed: Nov. 8, 2022

(65) Prior Publication Data

US 2023/0152803 A1    May 18, 2023

(30) Foreign Application Priority Data

Nov. 15, 2021  (JP) .................................. 2021-185506

(51) Int. Cl.
    *G05D 1/00*  (2006.01)
    *G06Q 10/0836*  (2023.01)

(52) U.S. Cl.
    CPC ......... *G05D 1/0088* (2013.01); *G05D 1/0005* (2013.01); *G05D 1/0287* (2013.01); *G06Q 10/0836* (2013.01)

(58) Field of Classification Search
    CPC .... G06Q 10/0836; G06Q 10/08; Y02T 10/70; B60P 3/00; B60P 3/07; B60L 53/00; G05D 1/0088; G05D 1/0005; G05D 1/0287

See application file for complete search history.

(56) References Cited

U.S. PATENT DOCUMENTS

| | | | |
|---|---|---|---|
| 9,975,651 B1* | 5/2018 | Eck | B64F 1/32 |
| 10,549,915 B1* | 2/2020 | Theobald | B65G 1/1375 |
| 11,372,398 B2* | 6/2022 | Theobald | G05D 1/0088 |
| 2019/0227551 A1 | 7/2019 | Igata et al. | |
| 2020/0130510 A1* | 4/2020 | Eck | B60L 53/14 |
| 2021/0132625 A1* | 5/2021 | Gillett | G05D 1/0088 |
| 2022/0024330 A1* | 1/2022 | Books | G06Q 10/06315 |

FOREIGN PATENT DOCUMENTS

| | | | | |
|---|---|---|---|---|
| JP | 2017143632 A | * | 8/2017 | ............. Y02E 60/10 |
| JP | 2019-128801 A | | 8/2019 | |

* cited by examiner

*Primary Examiner* — Kito R Robinson
*Assistant Examiner* — Alexander V Gentile
(74) *Attorney, Agent, or Firm* — Dinsmore & Shohl LLP (57) ABSTRACT

A delivery system including: a plurality of autonomously-moving-type delivery vehicles each including a battery and configured to deliver an article to a delivery destination by electric power the battery is charged with; and a transportation vehicle configured to carry and transport the plurality of the delivery vehicles. For each of the plurality of the delivery vehicles, based on a route for delivering the article and a remaining amount of charge of the battery, a surplus or shortfall in the remaining amount of charge of the battery required for traveling along the route is calculated, and based on the result of the calculation of the surplus or shortfall in the remaining amount of charge, surplus electric power is supplied from the battery of a delivery vehicle having a surplus remaining amount of charge to the battery of a delivery vehicle having a shortfall in the remaining amount of charge.

2 Claims, 8 Drawing Sheets

CONTROL METHOD FOR CONTROLLING DELIVERY SYSTEM

CROSS REFERENCE TO RELATED APPLICATIONS

This application is based upon and claims the benefit of priority from Japanese patent application No. 2021-185506, filed on Nov. 15, 2021, the disclosure of which is incorporated herein in its entirety by reference.

BACKGROUND

The present disclosure relates to a delivery system, a control method therefor, and a control program.

Japanese Unexamined Patent Application Publication No. 2019-128801 discloses a delivery system including an autonomously-moving-type delivery vehicle configured to deliver an article(s) to a delivery destination and a transportation vehicle configured to carry and transport the delivery vehicle. A transportation vehicle that carries therein a delivery vehicle travels to the destination of the article(s) to be delivered (hereinafter also referred to as "delivery destination" of the article(s)), and then the delivery vehicle gets out of the transportation vehicle and delivers the article(s) to the delivery destination.

SUMMARY

The inventors have found the following problem in a delivery system in which a transportation vehicle that carries therein a delivery vehicle travels to the destination of the article(s) to be delivered, and then the delivery vehicle gets out of the transportation vehicle and delivers the article(s) to the delivery destination.

In such a delivery system, there is a problem that in the case where the delivery vehicle moves autonomously by electric power its battery is charged with, when the remaining amount of charge of the battery falls to zero while the delivery vehicle is delivering the article(s), the delivery vehicle cannot deliver the article(s) to the delivery destination or cannot return to the transportation vehicle after delivering the article(s).

The present disclosure has been made in view of the above-described circumstances, and an object thereof is to provide a delivery system in which it is possible to suppress a remaining amount of charge of a battery of a delivery vehicle from falling to zero while the delivery vehicle is delivering an article(s).

A first exemplary aspect is a delivery system including:
a plurality of autonomously-moving-type delivery vehicles each including a chargeable and dischargeable battery and configured to deliver an article to a delivery destination by electric power the battery is charged with; and
a transportation vehicle configured to carry and transport the plurality of the delivery vehicles, in which
for each of the plurality of the delivery vehicles, based on a respective route for delivering the article and a respective remaining amount of charge of the battery, a surplus or shortfall in the remaining amount of charge of the battery required for traveling along the respective route is calculated, and
based on the result of the calculation of the surplus or shortfall in the remaining amount of charge of the battery for each of the plurality of the delivery vehicles, surplus electric power is supplied from, among the plurality of the delivery vehicles, the battery of a delivery vehicle having a surplus remaining amount of charge to the battery of a delivery vehicle having a shortfall in the remaining amount of charge.

Further, another exemplary aspect is a control method performed by a computer for controlling a delivery system that includes:
a plurality of autonomously-moving-type delivery vehicles each including a chargeable and dischargeable battery and configured to deliver an article to a delivery destination by electric power the battery is charged with; and
a transportation vehicle configured to carry and transport the plurality of the delivery vehicles,
the control method including:
calculating, for each of the plurality of the delivery vehicles, based on a respective route for delivering the article and a respective remaining amount of charge of the battery, a surplus or shortfall in the remaining amount of charge of the battery required for traveling along the respective route, and
supplying, based on the result of the calculation of the surplus or shortfall in the remaining amount of charge of the battery for each of the plurality of the delivery vehicles, surplus electric power from, among the plurality of the delivery vehicles, the battery of a delivery vehicle having a surplus remaining amount of charge to the battery of a delivery vehicle having a shortfall in the remaining amount of charge.

Further, another exemplary aspect is a control program for causing a computer to perform control of a delivery system that includes:
a plurality of autonomously-moving-type delivery vehicles each including a chargeable and dischargeable battery and configured to deliver an article to a delivery destination by electric power the battery is charged with; and
a transportation vehicle configured to carry and transport the plurality of the delivery vehicles,
the control program causing the computer to:
calculate, for each of the plurality of the delivery vehicles, based on a respective route for delivering the article and a respective remaining amount of charge of the battery, a surplus or shortfall in the remaining amount of charge of the battery required for traveling along the respective route, and
supply, based on the result of the calculation of the surplus or shortfall in the remaining amount of charge of the battery for each of the plurality of the delivery vehicles, surplus electric power from, among the plurality of the delivery vehicles, the battery of a delivery vehicle having a surplus remaining amount of charge to the battery of a delivery vehicle having a shortfall in the remaining amount of charge.

As described above, according to an aspect of the present disclosure, for each of the plurality of the delivery vehicles, based on a respective route for delivering the article and a respective remaining amount of charge of the battery, a surplus or shortfall in the remaining amount of charge of the battery required for traveling along the respective route is calculated, and based on the result of the calculation of the surplus or shortfall in the remaining amount of charge of the battery for each of the plurality of the delivery vehicles, surplus electric power is supplied from, among the plurality of the delivery vehicles, the battery of a delivery vehicle having a surplus remaining amount of charge to the battery of a delivery vehicle having a shortfall in the remaining amount of charge. Therefore, it is possible to suppress the remaining amount of charge of a battery of a delivery vehicle from falling to zero while the delivery vehicle is delivering an article.

Further, another exemplary aspect is a delivery system including:
a plurality of autonomously-moving-type delivery vehicles each including a chargeable and dischargeable battery and configured to deliver an article to a delivery destination by electric power the battery is charged with; and
a transportation vehicle configured to carry and transport the plurality of the delivery vehicles, in which
for each of the plurality of the delivery vehicles, based on a respective route for delivering the article and a respective remaining amount of charge of the battery, a surplus or shortfall in the remaining amount of charge of the battery required for traveling along the respective route is calculated, and
based on the result of the calculation of the surplus or shortfall in the remaining amount of charge of the battery for each of the plurality of the delivery vehicles, the article carried by, among the plurality of the delivery vehicles, a delivery vehicle having a shortfall in the remaining amount of charge is transferred to a delivery vehicle having a surplus remaining amount of charge.

Further, another exemplary aspect is a control method performed by a computer for controlling a delivery system that includes:
a plurality of autonomously-moving-type delivery vehicles each including a chargeable and dischargeable battery and configured to deliver an article to a delivery destination by electric power the battery is charged with; and
a transportation vehicle configured to carry and transport the plurality of the delivery vehicles,
the control method including:
calculating, for each of the plurality of the delivery vehicles, based on a respective route for delivering the article and a respective remaining amount of charge of the battery, a surplus or shortfall in the remaining amount of charge of the battery required for traveling along the respective route, and
transferring, based on the result of the calculation of the surplus or shortfall in the remaining amount of charge of the battery for each of the plurality of the delivery vehicles, the article carried by, among the plurality of the delivery vehicles, a delivery vehicle having a shortfall in the remaining amount of charge to a delivery vehicle having a surplus remaining amount of charge.

Further, another exemplary aspect is a control program for causing a computer to perform control of a delivery system that includes:
a plurality of autonomously-moving-type delivery vehicles each including a chargeable and dischargeable battery and configured to deliver an article to a delivery destination by electric power the battery is charged with; and
a transportation vehicle configured to carry and transport the plurality of the delivery vehicles,
the control program causing the computer to:
calculate, for each of the plurality of the delivery vehicles, based on a respective route for delivering the article and a respective remaining amount of charge of the battery, a surplus or shortfall in the remaining amount of charge of the battery required for traveling along the respective route, and
transfer, based on the result of the calculation of the surplus or shortfall in the remaining amount of charge of the battery for each of the plurality of the delivery vehicles, the article carried by, among the plurality of the delivery vehicles, a delivery vehicle having a shortfall in the remaining amount of charge to a delivery vehicle having a surplus remaining amount of charge.

As described above, according to an aspect of the present disclosure, for each of the plurality of the delivery vehicles, based on a respective route for delivering the article and a respective remaining amount of charge of the battery, a surplus or shortfall in the remaining amount of charge of the battery required to travel along the route is calculated, and based on the result of the calculation of the surplus or shortfall in the remaining amount of charge of the battery, the article carried by, among the plurality of the delivery vehicles, a delivery vehicle having a shortfall in the remaining amount of charge is transferred to a delivery vehicle having a surplus remaining amount of charge. Therefore, it is possible to suppress the remaining amount of charge of a battery of a delivery vehicle from falling to zero while the delivery vehicle is delivering an article.

According to the present disclosure, it is possible to provide a delivery system in which it is possible to suppress the remaining amount of charge of a battery of a delivery vehicle from falling to zero while the delivery vehicle is delivering an article.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments will be described hereinafter in detail with reference to the drawings. The same or corresponding elements are denoted by the same reference numerals (or symbols) throughout the drawings, and redundant descriptions thereof are omitted as required for clarifying the explanation.

First Embodiment

<Configuration of Delivery System>

Figure 1:
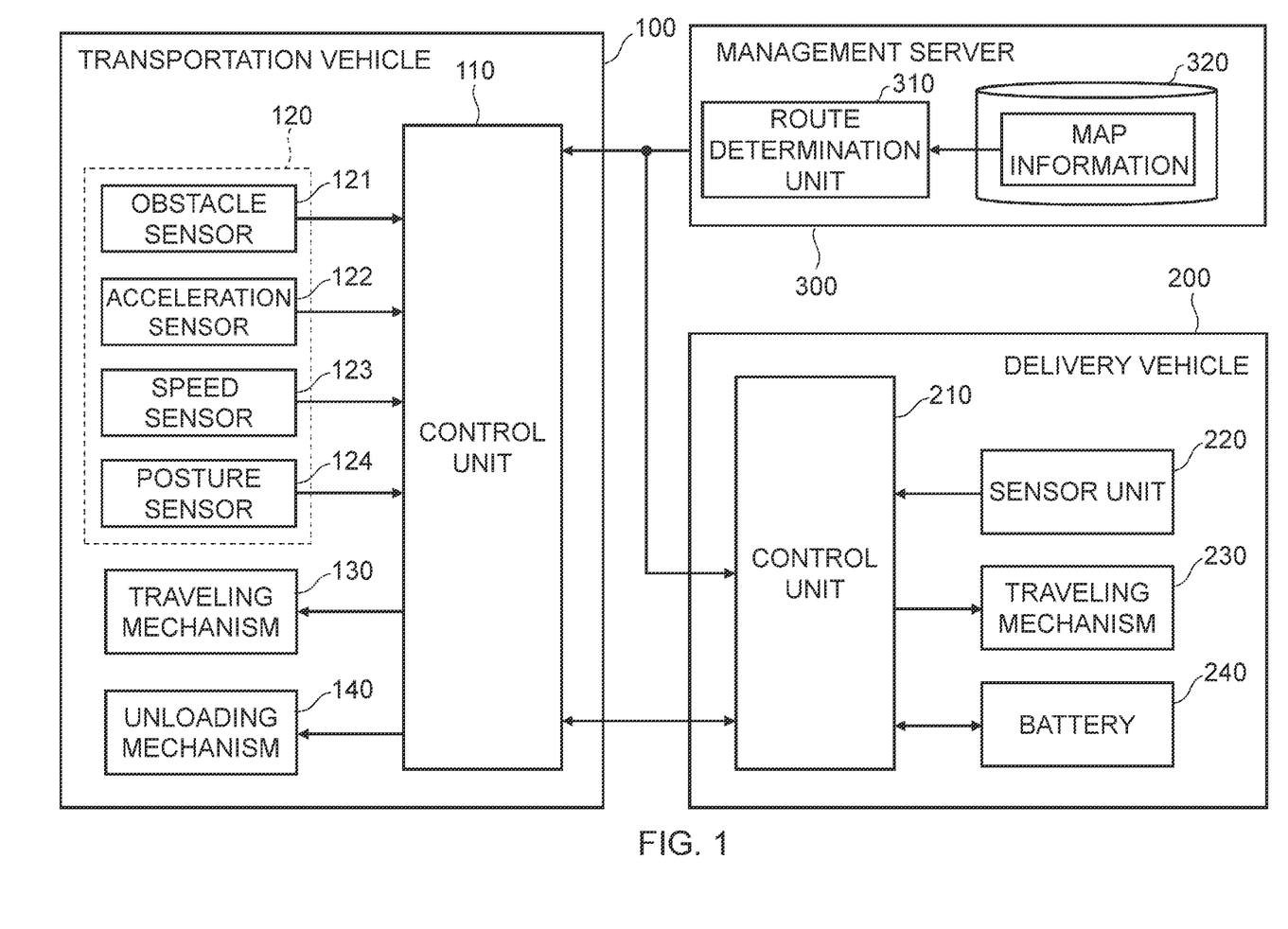
FIG. 1 is a block diagram of a delivery system according to a first embodiment.

Firstly, a delivery system and its control method according to a first embodiment will be described with reference to FIG. 1. FIG. 1 is a block diagram of a delivery system according to the first embodiment. As shown in FIG. 1, the delivery system according to this embodiment includes a transportation vehicle 100, a delivery vehicle 200, and a management server 300. After the transportation vehicle 100 carrying the delivery vehicle 200 travels toward the delivery destination of an article(s), the delivery vehicle 200 gets out of the transportation vehicle 100 and delivers the article(s) to the delivery destination.

Firstly, the transportation vehicle 100 will be described.

The transportation vehicle 100 carries and transports the delivery vehicle 200. Although the transportation vehicle 100 in this embodiment is an autonomous mobile vehicle (i.e., an autonomously-driven vehicle), it may be a vehicle driven by a human driver. As shown in FIG. 1, the transportation vehicle 100 includes a control unit 110, a sensor unit 120, a traveling mechanism 130, and an unloading mechanism 140. Further, the transportation vehicle 100 is wirelessly connected to the delivery vehicle 200 and the management server 300 so as to be able to communicate with them.

Note that when the management server 300 is disposed in the transportation vehicle 100, the transportation vehicle 100 may be connected to the management server 300 through a cable(s). Further, although only one delivery vehicle 200 is shown in FIG. 1, the transportation vehicle 100 may carry a plurality of delivery vehicles 200, as will be described later.

The control unit 110 controls the traveling mechanism 130 based on various types of information acquired from the sensor unit 120. In this way, the transportation vehicle 100 autonomously travels. Further, the control unit 110 controls the unloading mechanism 140 for enabling the delivery vehicle 200 to get out of the transportation vehicle 100.

The control unit 110 includes, for example, an arithmetic unit such as a CPU (Central Processing Unit), and a storage unit such as a RAM (Random Access Memory) and a ROM (Read Only Memory) in which various types of control programs, data, and the like are stored. That is, the control unit 110 has a function as a computer, and controls the traveling mechanism 130 and the unloading mechanism 140 based on the aforementioned various types of control programs and the like.

In the example shown in FIG. 1, the sensor unit 120 includes an obstacle sensor 121, an acceleration sensor 122, a speed sensor 123, and a posture sensor 124.

The obstacle sensor 121 detects an obstacle ahead of the transportation vehicle 100 in the traveling direction thereof. Further, the obstacle sensor 121 detects an obstacle at the time when the delivery vehicle 200 gets out of the transportation vehicle 100. The obstacle sensor 121 is, for example, a radar sensor, a sonar sensor, an ultrasonic sensor, a LIDAR sensor, a camera, or the like. Examples of the obstacle include people such as pedestrians and animals as well as other vehicles and objects on the road that have accidentally fallen from other vehicles.

The acceleration sensor 122 detects the acceleration of the transportation vehicle 100. It is possible to detect vibrations of the transportation vehicle 100 caused by irregularities or the like on the road surface by detecting the acceleration of the transportation vehicle 100.

The speed sensor 123 detects the speed of the transportation vehicle 100.

The posture sensor 124 detects the posture of the transportation vehicle 100. It is possible to detect the gradient of the road on which the transportation vehicle 100 is traveling (hereinafter also referred to as the road gradient) by the posture sensor 124.

The traveling mechanism 130 is a mechanism for moving the transportation vehicle 100 (i.e., making the transportation vehicle 100 travel). For example, the traveling mechanism 130 includes, in addition to the driving mechanism, such as a motor or an engine, for moving the transportation vehicle 100, a braking mechanism for stopping the transportation vehicle 100, and a steering mechanism for making the transportation vehicle 100 turn (i.e., making the transportation vehicle 100 change the traveling direction).

Figure 2:
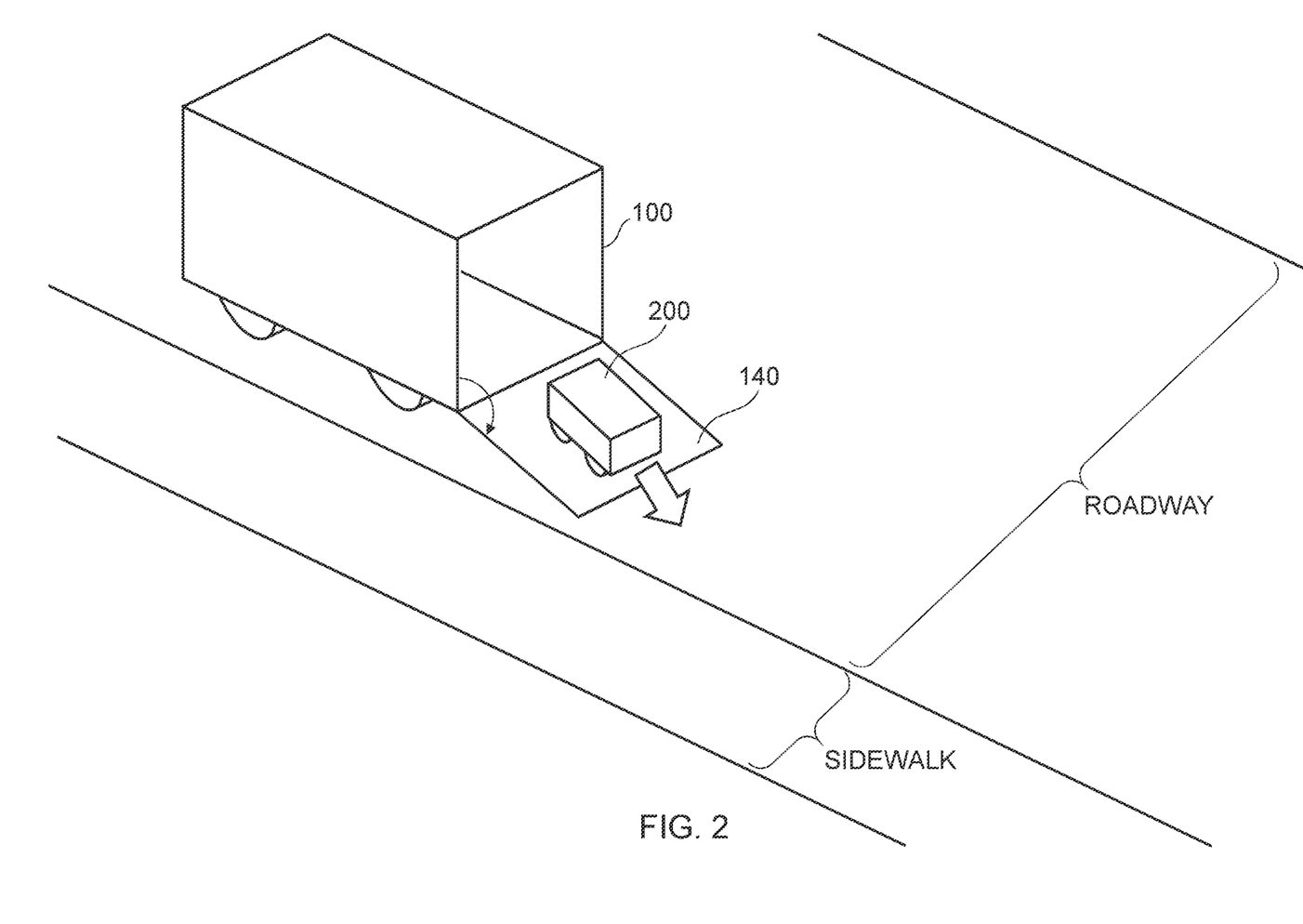
FIG. 2 is a perspective view showing a state in which a delivery vehicle 200 gets out of a transportation vehicle 100.
Figure 3:
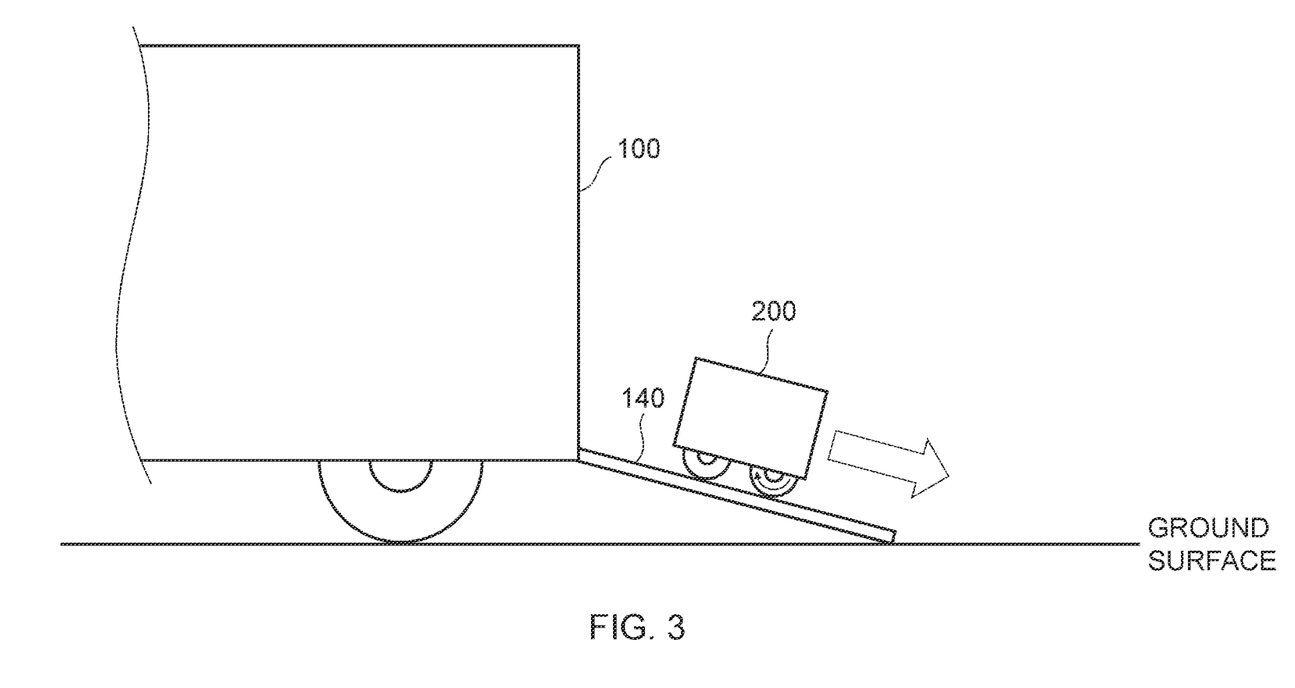
FIG. 3 is a side view showing a state in which the delivery vehicle 200 gets out of the transportation vehicle 100.

The unloading mechanism 140 is a mechanism for making the delivery vehicle 200 get out of the transportation vehicle 100 (or for enabling the delivery vehicle 200 to get out of the transportation vehicle 100, or for unloading the delivery vehicle 200 from the transportation vehicle 100). Here, an example of the unloading mechanism 140 will be described with reference to FIGS. 2 and 3. FIG. 2 is a perspective view showing a state in which the delivery vehicle 200 gets out of the transportation vehicle 100. FIG. 3 is a side view showing the state in which the delivery vehicle 200 gets out of the transportation vehicle 100.

As shown in FIGS. 2 and 3, the unloading mechanism 140 according to this embodiment is a simple plate-like slope. In the example shown in FIGS. 2 and 3, the unloading mechanism 140 also functions as an opening/closing door provided in the rear part of the transportation vehicle 100. The unloading mechanism 140 is connected to one side (e.g., a side at the lower edge) of the opening provided in the rear part of the transportation vehicle 100. In the normal state, the unloading mechanism 140 serves as an opening/closing door and is closed. However, when the delivery vehicle 200 gets out of the transportation vehicle 100, the unloading mechanism 140, which serves as the opening/closing door, is opened and functions as a slope extending from the inside of the transportation vehicle 100 to the ground surface.

For example, when the delivery vehicle 200 gets out of the transportation vehicle 100 to delivery an item(s), as shown in FIG. 1, the control unit 110 of the transportation vehicle 100 instructs the control unit 210 of the delivery vehicle 200 to get out of the transportation vehicle 100. At that time, the control unit 110 of the transportation vehicle 100 controls the unloading mechanism 140. Specifically, as shown in FIGS. 2 and 3, the control unit 110 opens the unloading mechanism 140, which functions as the opening/closing door, and makes the unloading mechanism 140 function as a slope extending from the inside of the transportation vehicle 100 to the ground surface. Then, as shown in FIGS. 2 and 3, the delivery vehicle 200 travels on the unloading mechanism 140 and thereby gets down onto the roadway. Further, the delivery vehicle 200 delivers the article(s) to the delivery destination, for example, by traveling from the roadway to the sidewalk and to the delivery destination.

Note that the unloading mechanism 140 shown in FIGS. 2 and 3 may be provided separately from the opening/closing door provided in the rear part of the transportation vehicle 100 as long as it can function as a slope. In such a case, in the normal state, the unloading mechanism 140 is housed, for example, under the floor of the transportation vehicle 100.

Further, the unloading mechanism 140 shown in FIGS. 2 and 3 is just an example, and the mechanism is not limited to any particular mechanism as long as it can make the delivery vehicle 200 get out of the transportation vehicle 100. The unloading mechanism 140 may be, for example, a conveyor or a crane.

Next, the delivery vehicle 200 will be described.

The delivery vehicle 200 is an autonomously-moving-type vehicle which, after being transported by the transportation vehicle 100, gets out of the transportation vehicle 100 and delivers an article(s) to the delivery destination thereof. As shown in FIG. 1, the transportation vehicle 200 includes a control unit 210, a sensor unit 220, a traveling mechanism 230, and a battery 240. Further, the delivery vehicle 200 is wirelessly connected to the transportation vehicle 100 and the management server 300 so as to be able to communicate with them. Note that when the management server 300 is disposed in the delivery vehicle 200, the delivery vehicle 200 may be connected to the management server 300 through a cable(s).

The traveling control unit 210 controls the traveling mechanism 230 based on various types of information acquired from the sensor unit 220. That is, the delivery vehicle 200 autonomously travels as the control unit 210 controls the traveling mechanism 230. Note that, similarly to the sensor unit 120 of the transportation vehicle 100, the sensor unit 220 includes various types of sensors.

Similarly to the control unit 110 of the transportation vehicle 100, the control unit 210 includes an arithmetic unit such as a CPU, and a storage unit such as a RAM and a ROM in which various types of control programs, data, and the like are stored. That is, the traveling control unit 210 has a function as a computer, and controls the traveling mechanism 230 based on the aforementioned various types of control programs and the like.

The control unit 210 acquires the delivery route for delivering an article(s) from the management server 300 and also acquires, from the battery 240, information about the remaining amount of charge of the battery 240. Then, the control unit 210 calculates, based on the delivery route and the information about the remaining amount of charge of the battery 240 acquired from the management server 300, a surplus or shortfall in the remaining amount of charge of the battery 240 required for the delivery vehicle 200 to travel along the delivery route thereof. When the remaining amount of charge of the battery 240 required for the delivery vehicle 200 to travel along the delivery route thereof falls short, the control unit 210 requests another delivery vehicle 200 having a surplus remaining amount of charge of its battery 240 to supply the surplus electric power.

A method of controlling, by the control unit 210, the remaining amount of charge of the battery 240 will be described later.

The traveling mechanism 230 is a mechanism for moving the delivery vehicle 200 (i.e., making the delivery vehicle 200 travel). For example, the traveling mechanism 230 includes, in addition to the driving mechanism, such as a motor or an engine, for moving the delivery vehicle 200, a braking mechanism for stopping the delivery vehicle 200, and a steering mechanism for making the delivery vehicle 200 turn (i.e., making the delivery vehicle 200 change the traveling direction).

The battery 240 is a secondary battery that can be charged and discharged, such as a lithium-ion battery. The battery 240 is a power supply device that supplies a source of power (electricity) to the control unit 210, the sensor unit 220, and the traveling mechanism 230. That is, the delivery vehicle 200 delivers an article(s) to the delivery destination using the electric power its battery 240 charged with.

Next, the management server 300 will be described.

The management server 300 is a server for communicating with the transportation vehicle 100 and the delivery vehicle 200 and managing the delivery system. The management server 300 is, for example, a cloud server. As shown in FIG. 1, the management server 300 includes a route determination unit 310 and a storage unit 320.

The route determination unit 310 is configured of, for example, an arithmetic unit such as a CPU. As shown in FIG. 1, the route determination unit 310 determines a delivery route from the place where the transportation vehicle 100 is currently present to a delivery destination based on map information stored in the storage unit 320. Then, the route determination unit 310 transmits the determined delivery route to the control unit 110 of the transportation vehicle 100 and the control unit 210 of the delivery vehicle 200. Further, the map information may include road-surface information.

The storage unit 320 is configured of, for example, RAM, ROM, and the like, and stores various control programs and data in addition to the map information.

That is, the management server 300 has a function as a computer, and controls the delivery system based on the aforementioned various types of control programs and the like.

<Method for Controlling Remaining Amount of Charge of Battery 240>

Figure 4:
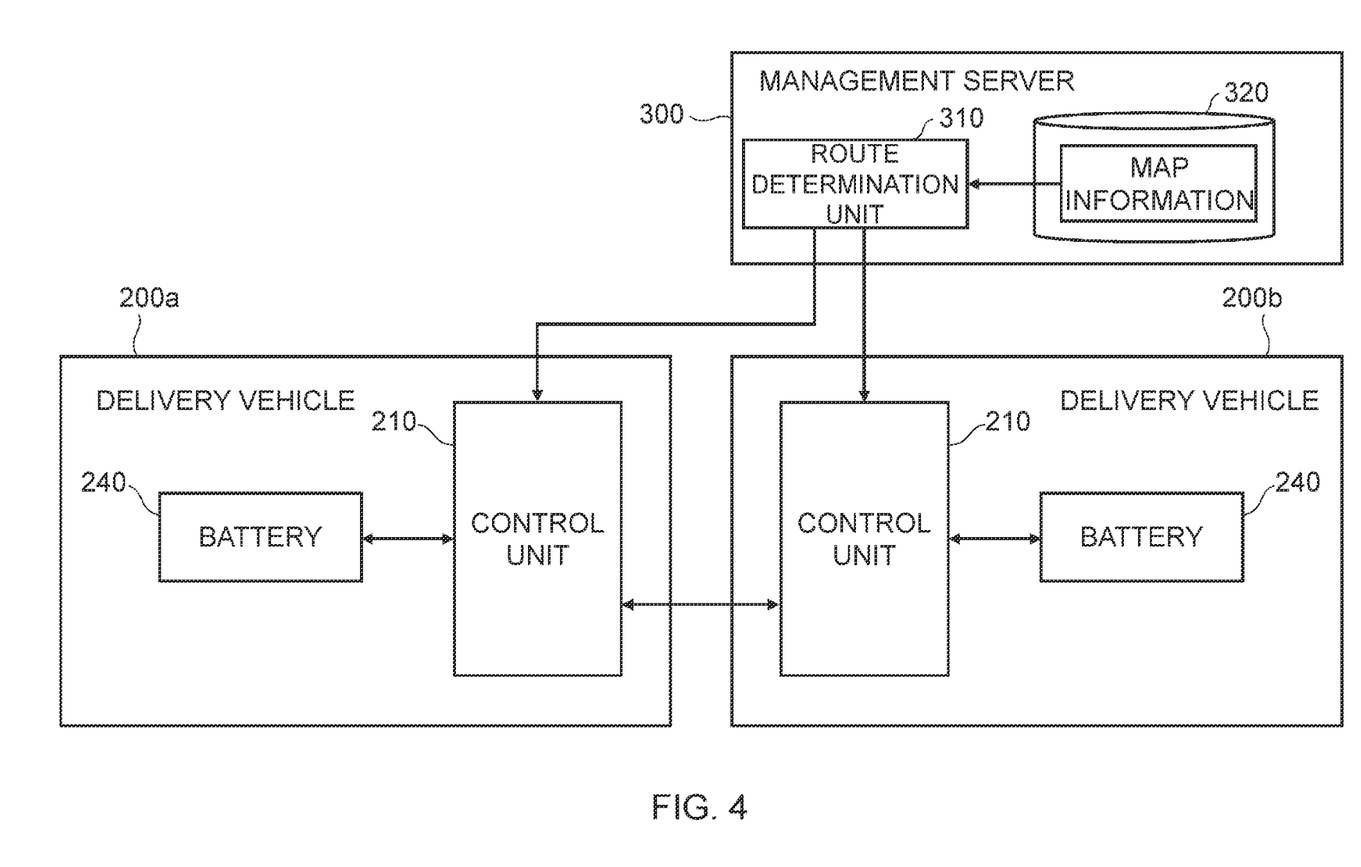
FIG. 4 is a block diagram of a delivery system according to the first embodiment.
Figure 5:
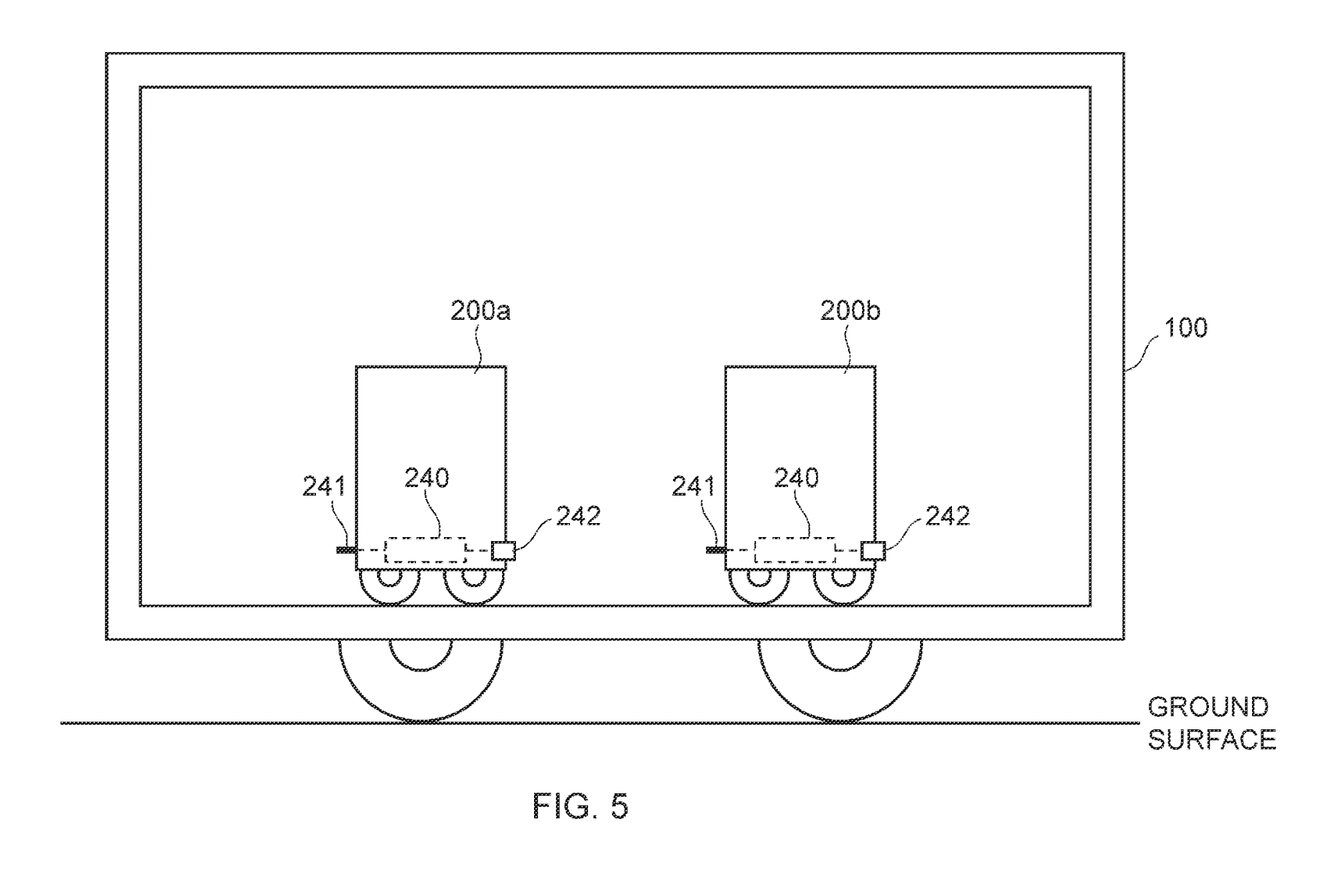
FIG. 5 is a side view showing two delivery vehicles 200*a* and 200*b* inside the transportation vehicle 100.
Figure 6:
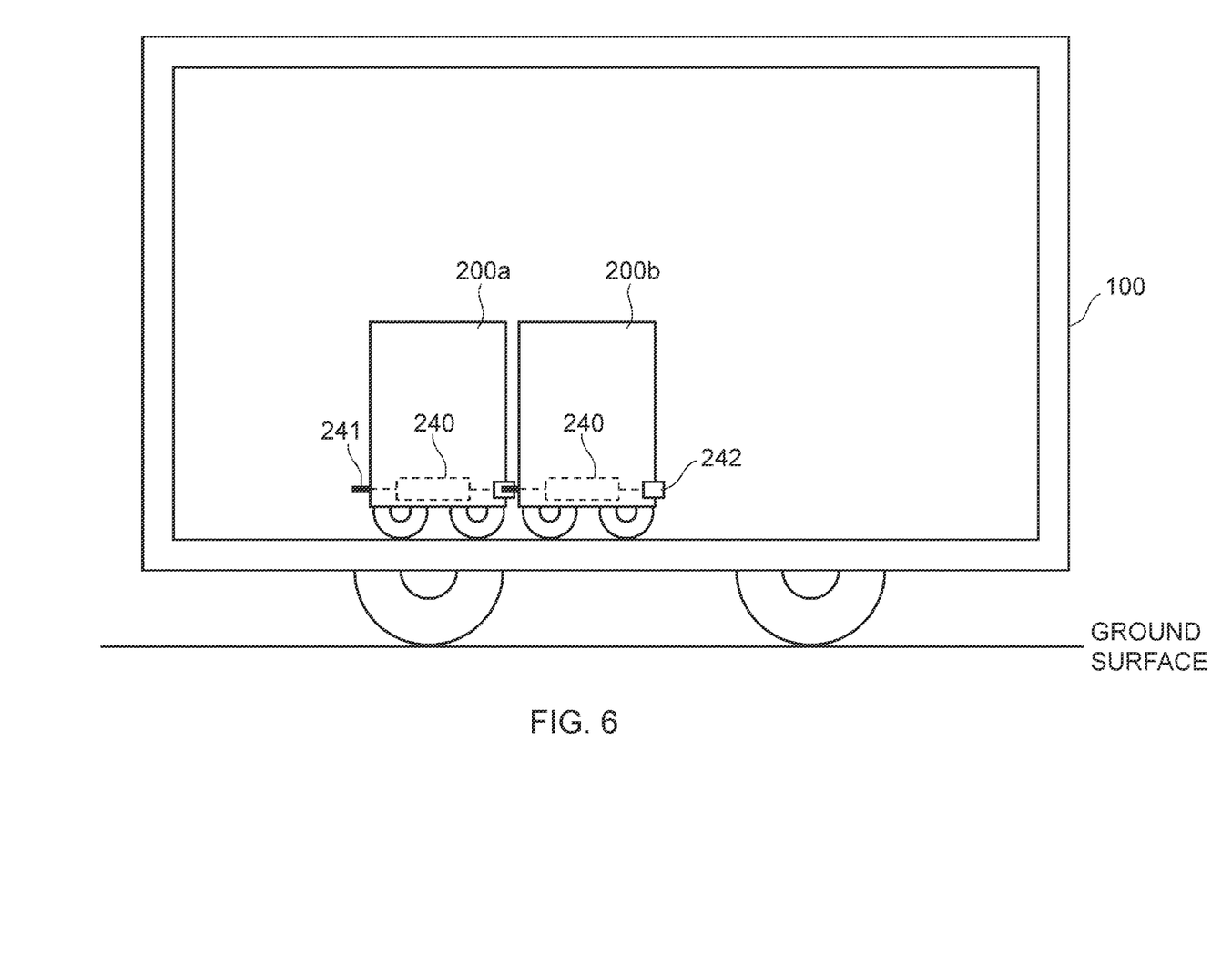
FIG. 6 is a side view showing two delivery vehicles 200*a* and 200*b* inside the transportation vehicle 100.

Next, a method for controlling the remaining amount of charge of the battery 240 will be described with reference to FIGS. 4 to 6. FIG. 4 is a block diagram of a delivery system according to the first embodiment. FIGS. 5 and 6 are each a side view showing two delivery vehicles 200a and 200b inside the transportation vehicle 100.

Note that in FIG. 4, the delivery system includes only two delivery vehicles 200a and 200b and the management server 300, and the transportation vehicle 100 shown in FIG. 1 is omitted. Further, the delivery vehicles 200a and 200b each has a configuration same as that of the delivery vehicle 200 shown in FIG. 1. Here, in FIG. 4, the delivery vehicles 200a and 200b include only the control unit 210 and the battery 240, and the sensor unit 220 and the traveling mechanism 230 shown in FIG. 1 are omitted.

As described above, the control unit 210 of each of the delivery vehicles 200a and 200b acquires the delivery route for delivering an article(s) from the management server 300 and also acquires, from the battery 240, information about the remaining amount of charge of the battery 240. Then, the control unit 210 of each of the delivery vehicles 200a and 200b calculates, based on the delivery route and the information about the remaining amount of charge of the battery 240 acquired from the management server 300, a surplus or shortfall in the remaining amount of charge of the battery 240 required for traveling along the delivery route.

Here, the delivery vehicle 200a has a shortfall in the remaining amount of charge of the battery 240 required to travel along the delivery route thereof whereas the delivery vehicle 200b has a surplus remaining amount of charge of the battery 240 required to travel along the delivery route thereof. In this case, due to the shortfall in the remaining amount of charge of the battery 240 of the delivery vehicle 200a, the control unit 210 of the delivery vehicle 200a requests the control unit 210 of the delivery vehicle 200b having a surplus remaining amount of charge of its battery 240 to supply its surplus electric power to the delivery vehicle 200a. As a result, surplus electric power is supplied from the battery 240 of the delivery vehicle 200b to the battery 240 of the delivery vehicle 200a.

Note that in FIG. 4, the result of the calculation of the surplus or shortfall in the remaining amount of charge of the battery 240 of the delivery vehicle 200*a* may be transmitted from the control unit 210 of the delivery vehicle 200*a* to the management server 300. Similarly, the result of the calculation of the surplus or shortfall in the remaining amount of charge of the battery 240 of the delivery vehicle 200*b* may be transmitted from the control unit 210 of the delivery vehicle 200*b* to the management server 300. Then, the management server 300 may instruct the control unit 210 of the delivery vehicle 200*b* to supply its surplus electric power from the battery 240 of the delivery vehicle 200*b* to the battery 240 of the delivery vehicle 200*a*.

For example, as shown in FIGS. 5 and 6, the delivery vehicles 200*a* and 200*b* each includes a plug 241 and a socket 242 that are electrically connected to the respective batteries 240. As shown in FIG. 6, the plug 241 of the delivery vehicle 200*b* and the socket 242 of the delivery vehicle 200*a* are fitted with each other and can be electrically connected. That is, as shown in FIG. 6, the battery 240 of the delivery vehicle 200*a* and the battery 240 of the delivery vehicle 200*b* are electrically connected with each other and surplus electric power is supplied from the battery 240 of the delivery vehicle 200*b* to the battery 240 of the delivery vehicle 200*a*.

Note that although not shown in the drawings, the plug 241 of the delivery vehicle 200*a* and the socket 242 of the delivery vehicle 200*b* can be fitted with each other and can be electrically connected. Further, the plug 241 and the socket 242 shown in FIGS. 5 and 6 are just an example and they may have any configuration as long as the battery 240 of the delivery vehicle 200*a* can be electrically connected with the battery 240 of the delivery vehicle 200*b*.

As described above, in the delivery system according to this embodiment, for each of the plurality of the delivery vehicles 200*a* and 200*b*, based on the delivery route for delivering the article(s) and the information about the remaining amount of charge of the battery 240, a surplus or shortfall in the remaining amount of charge of the battery 240 required for traveling along the delivery route is calculated. Then, based on the result of the calculation of the surplus or shortfall in the remaining amount of charge of the battery, surplus electric power is supplied from the battery 240 of the delivery vehicle 200*b* having a surplus remaining amount of charge to the battery 240 of the delivery vehicle 200*a* having a shortfall in the remaining amount of charge. Therefore, in the delivery system according to this embodiment, it is possible to suppress the remaining amount of charge of the battery 240 of each of the delivery vehicles 200*a* and 200*b* from falling to zero while the delivery vehicles 200*a* and 200*b* are delivering articles.

As a matter of course, the transportation vehicle 100 may carry three or more delivery vehicles 200.

Second Embodiment

Figure 7:
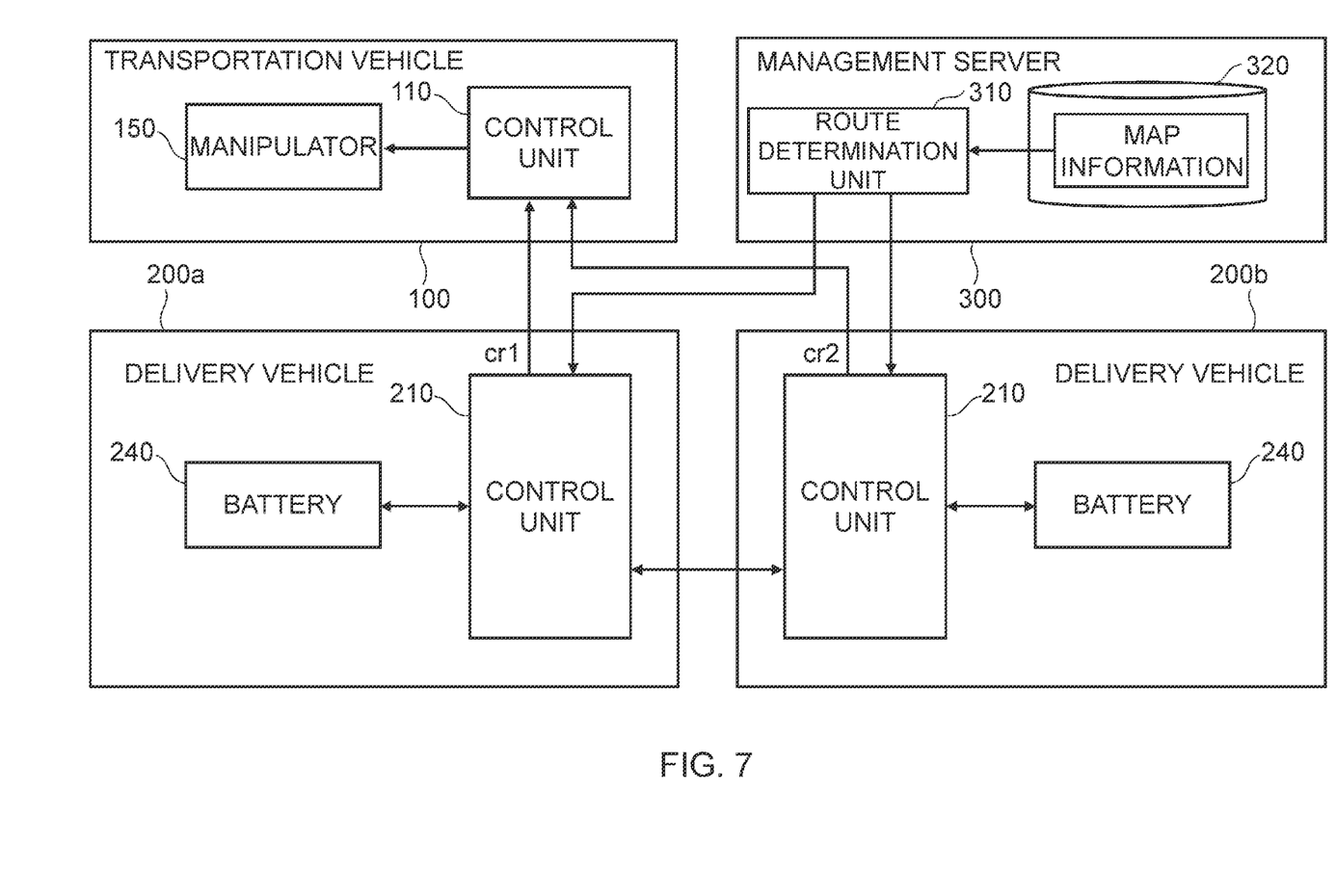
FIG. 7 is block diagram of a delivery system according to a second embodiment.
Figure 8:
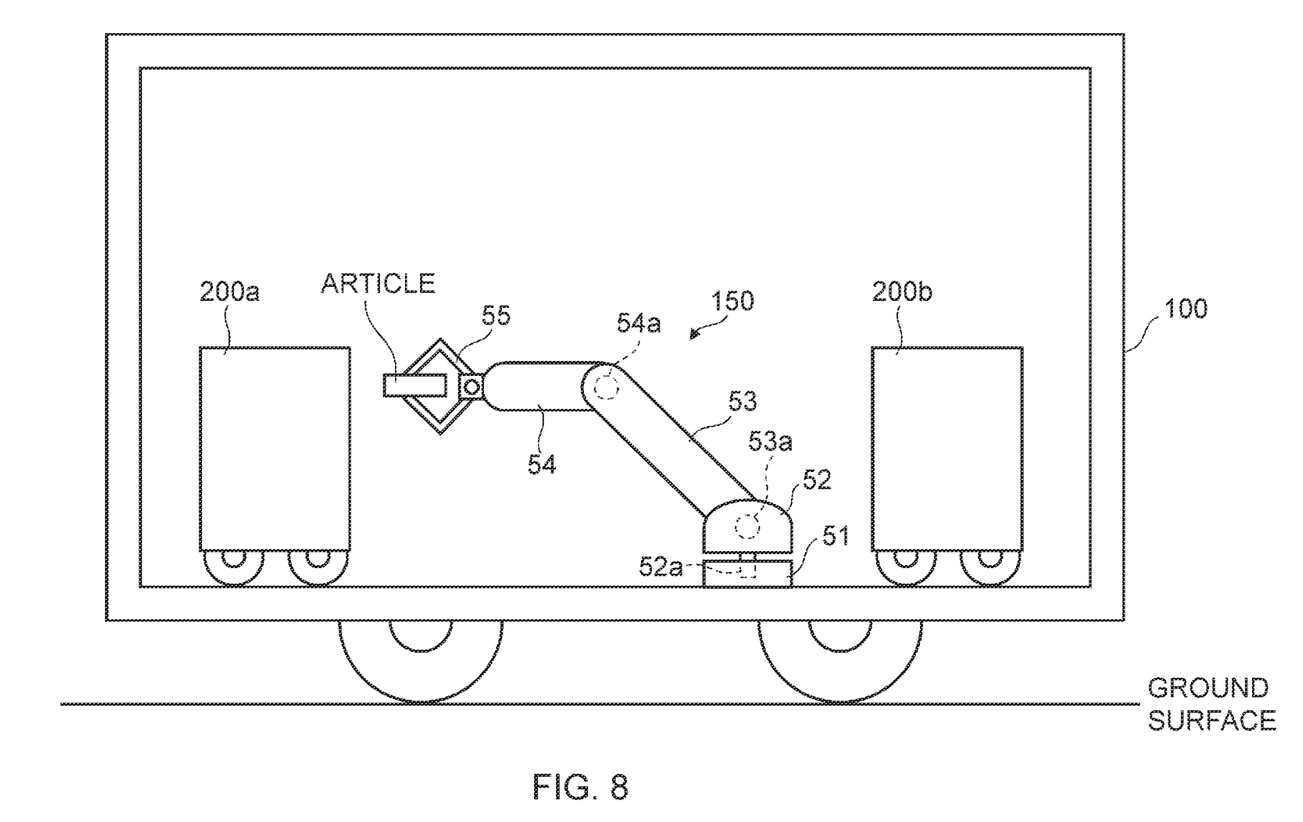
FIG. 8 is a side view showing two delivery vehicles 200*a* and 200*b* inside the transportation vehicle 100.

Next, a delivery system and its control method according to a second embodiment will be described with reference to FIGS. 7 and 8. FIG. 7 is a block diagram of a delivery system according to the second embodiment. FIG. 8 is a side view showing two delivery vehicles 200*a* and 200*b* inside the transportation vehicle 100.

As shown in FIG. 7, in the delivery system according to the second embodiment, the transportation vehicle 100 includes a manipulator 150. Note that in FIG. 7, the delivery vehicle 100 includes only the control unit 110 and the manipulator 150, and the sensor unit 120, the traveling mechanism 130, and the unloading mechanism 140 shown in FIG. 1 are omitted.

As shown in FIG. 7, in the delivery system according to this embodiment too, the control unit 210 of each of the delivery vehicles 200*a* and 200*b* acquires the delivery route for delivering an article(s) from the management server 300 and also acquires, from the battery 240, information about the remaining amount of charge of the battery 240. Then, the control unit 210 of each of the delivery vehicles 200*a* and 200*b* calculates, based on the delivery route and the information about the remaining amount of charge of the battery 240 acquired from the management server 300, a surplus or shortfall in the remaining amount of charge of the battery 240 required for traveling along the delivery route.

As shown in FIG. 7, the control unit 210 of the delivery vehicle 200*a* transmits the result of the calculation cr1 of the surplus or shortfall in the remaining amount of charge of the battery 240 required for traveling along the delivery route of the delivery vehicle 200*a* to the control unit 110 of the transportation vehicle 100. Similarly, the control unit 210 of the delivery vehicle 200*b* transmits the result of the calculation cr2 of the surplus or shortfall in the remaining amount of charge of the battery 240 required for traveling along the delivery route of the delivery vehicle 200*b* to the control unit 110 of the transportation vehicle 100. Here, the delivery vehicle 200*a* has a shortfall in the remaining amount of charge of the battery 240 required to travel along the delivery route thereof whereas the delivery vehicle 200*b* has a surplus remaining amount of charge of the battery 240 required to travel along the delivery route thereof.

In this case, in the delivery system shown in FIG. 7, the control unit 110 of the transportation vehicle 100 controls the manipulator 150 so that the article(s) carried by the delivery vehicle 200*a* having a shortfall in the remaining amount of charge of its battery 240 is transferred to the delivery vehicle 200*b* having a surplus remaining amount of charge of its battery 240.

FIG. 8 illustrates a state in which the manipulator 150 transfers an article carried by the delivery vehicle 200*a* having a shortfall in the remaining amount of charge of its battery 240 to the delivery vehicle 200*b* having a surplus remaining amount of charge of its battery 240.

Note that the manipulator 150 shown in FIG. 8 is just an example, and it may have any configuration as long as the articles carried by the delivery vehicles 200*a* and 200*b* can be transferred.

In the example shown in FIG. 8, the manipulator 150 includes a base part 51, a link base part 52, a first link 53, a second link 54, and an end effector 55. Each article is grasped by the end effector 55 and transferred.

The base part 51 is fixed to the floor surface of the transportation vehicle 100.

The link base part 52 is connected to the base part 51 through a rotation shaft 52*a* so that the link base part 52 can rotate around the rotation shaft 52*a*. The rotation shaft 52*a* of the link base part 52 is a shaft that is positioned perpendicular to the floor surface of the transportation vehicle 100. The link base part 52 is rotationally driven by a motor or the like (not shown).

The first link 53 is rotatably connected to the link base part 52 through a first joint part 53*a* provided at the rear end of the first link 53. Further, the second link 54 is rotatably connected to the tip of the first link 53 through a second joint part 54*a* provided at the rear end of the second link 54. The end effector 55 is connected to the tip of the second link 54.

Note that the rotation axis of the first joint part 53*a* and the second joint part 54*a* is an axis parallel to the floor surface of the transportation vehicle 100. The height of the end effector 55 can be changed by rotating the first link 53 and the second link 54. The first link 53 and the second link 54 are rotationally driven by a motor or the like (not shown). By the above-described configuration, each article can be grasped and transferred using the end effector 55.

Note that the configuration of the end effector 55 is not particularly limited as long as each article can be transferred using the end effector 55. For example, the end effector 55 may adsorb an article and transfer the article. Further, the link mechanism in the example shown in FIG. 8 is configured of two links, i.e., the first link 53 and the second link 54, but it may be configured of three or more links.

As described above, in the delivery system according to this embodiment, for each of the plurality of the delivery vehicles 200a and 200b, based on the delivery route for delivering the article(s) and the information about the remaining amount of charge of the battery 240, a surplus or shortfall in the remaining amount of charge of the battery 240 required for traveling along the delivery route is calculated. Then, based on the result of the calculation of the surplus or shortfall in the remaining amount of charge of the battery, an article(s) loaded on the delivery vehicle 200a having a shortfall in the remaining amount of charge of its battery 240 is transferred to the delivery vehicle 200b having a surplus remaining amount of charge of its battery 240.

That is, the delivery vehicle 200b delivers the transferred article(s) instead of the delivery vehicle 200a. Accordingly, the problem of shortfall in the remaining amount of charge of the battery 240 of the delivery vehicle 200a is solved. Therefore, in the delivery system according to this embodiment, it is possible to suppress the remaining amount of charge of the battery 240 of each of the delivery vehicles 200a and 200b from falling to zero while the delivery vehicles 200a and 200b are delivering article(s). The rest of the configuration is similar to that of the first embodiment, and therefore the description thereof is omitted.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system having a computer, the delivery system comprising:
a plurality of autonomously-moving-type delivery vehicles each including a chargeable and dischargeable battery with a connector for electrical connection to another battery and configured to deliver an article to a delivery destination by electric power the chargeable and dischargeable battery is charged with, each of the plurality of autonomously-moving-type delivery vehicles having a central processing unit, the central processing unit for each of the plurality of autonomously-moving-type delivery vehicles configured to:
acquire a respective delivery route for delivering the article;
acquire, from the chargeable and dischargeable battery, information about a remaining amount of charge of the chargeable and dischargeable battery;
calculate, based on the respective delivery route and the information about the remaining amount of charge of the chargeable and dischargeable battery as acquired, a surplus or shortfall in the remaining amount of charge of the chargeable and dischargeable battery required for traveling along the respective delivery route; and
a transportation vehicle having a second central processing unit and an unloading mechanism coupled thereto that is configured to move between a closed position and an opened position, the transportation vehicle is configured to carry and transport the plurality of the delivery vehicles, the transportation vehicle includes an obstacle sensor configured to detect an obstacle ahead of the transportation vehicle in a traveling direction thereof, an acceleration sensor configured to detect an acceleration of the transportation vehicle and detect vibrations of the transportation vehicle caused by irregularities on the road surface, a speed sensor configured to detect a speed of the transportation vehicle, and a posture sensor configured to detect a gradient of the road on which the transportation vehicle is traveling, the unloading mechanism is configured to unload each of the plurality of autonomously-moving-type delivery vehicles when in the opened positioned by being a slope extending from the inside of the transportation vehicle to a ground surface, the second central processing unit controls the unloading mechanism between the open position and the closed position,
the computer configured to:
determine the respective delivery route for delivering the article from a place where the transportation vehicle is currently present to the delivery destination based on map information, the map information including road-surface information,
calculate, for each of the plurality of the delivery vehicles, based on the respective route for delivering the article and the respective remaining amount of charge of the chargeable and dischargeable battery, the surplus or shortfall in the remaining amount of charge of the chargeable and dischargeable battery required for traveling along the respective route, and
supply, based on the result of the calculation of the surplus or shortfall in the remaining amount of charge of the chargeable and dischargeable battery for each of the plurality of the delivery vehicles, surplus electric power from, among the plurality of the delivery vehicles, the chargeable and dischargeable battery of a first delivery vehicle having a surplus remaining amount of charge to the chargeable and dischargeable battery of a second delivery vehicle having a shortfall in the remaining amount of charge by electrically coupling the connector of the first delivery vehicle to the connector of the second delivery vehicle through autonomous driving.

2. A delivery system having a computer, the delivery system comprising:
- a plurality of autonomously-moving-type delivery vehicles each including a chargeable and dischargeable battery and configured to deliver an article to a delivery destination by electric power the chargeable and dischargeable battery is charged with, each of the plurality of autonomously-moving-type delivery vehicles having a central processing unit, the central processing unit for each of the plurality of autonomously-moving-type delivery vehicles configured to:
- acquire a respective delivery route for delivering the article;
- acquire, from the chargeable and dischargeable battery, information about a remaining amount of charge of the chargeable and dischargeable battery;
- calculate, based on the respective delivery route and the information about the remaining amount of charge of the battery as acquired, a surplus or shortfall in the remaining amount of charge of the chargeable and dischargeable battery required for traveling along the respective delivery route; and
- a transportation vehicle including a transfer device that transfers the article from a delivery vehicle to another delivery vehicle and is controlled by the computer, and configured to carry and transport the plurality of the delivery vehicles, the transportation vehicle further having a second central processing unit and an unloading mechanism coupled thereto that is configured to move between a closed position and an opened position, the transportation vehicle further including an obstacle sensor configured to detect an obstacle ahead of the transportation vehicle in a traveling direction thereof, an acceleration sensor configured to detect an acceleration of the transportation vehicle and detect vibrations of the transportation vehicle caused by irregularities on the road surface, a speed sensor configured to detect a speed of the transportation vehicle, and a posture sensor configured to detect a gradient of the road on which the transportation vehicle is traveling, the unloading mechanism is configured to unload each of the plurality of autonomously-moving-type delivery vehicles when in the opened positioned by being a slope extending from the inside of the transportation vehicle to a ground surface, the second central processing unit controls the unloading mechanism between the open position and the closed position, the computer configured to:
- determine the respective delivery route for delivering the article from a place where the transportation vehicle is currently present to the delivery destination based on map information, the map information including road-surface information,
- calculate, for each of the plurality of the delivery vehicles, based on the respective route for delivering the article and the respective remaining amount of charge of the chargeable and dischargeable battery, the surplus or shortfall in the remaining amount of charge of the chargeable and dischargeable battery required for traveling along the respective route, and
- control the transfer device to transfer the article, based on the result of the calculation of the surplus or shortfall in the remaining amount of charge of the chargeable and dischargeable battery for each of the plurality of the delivery vehicles, to transfer the article carried by, among the plurality of the delivery vehicles, a delivery vehicle having a shortfall in the remaining amount of charge to a delivery vehicle having a surplus remaining amount of charge.

* * * * *